3,168,419
PURIFICATION OF SUGAR JUICE
Ferdinando Galé, Abbiategrasso, near Milan, Italy, assignor to Dorr-Oliver Incorporated, Stamford, Conn., a corporation of Delaware
Filed July 24, 1961, Ser. No. 126,148
Claims priority, application Italy, July 28, 1960, 13,588/60
6 Claims. (Cl. 127—50)

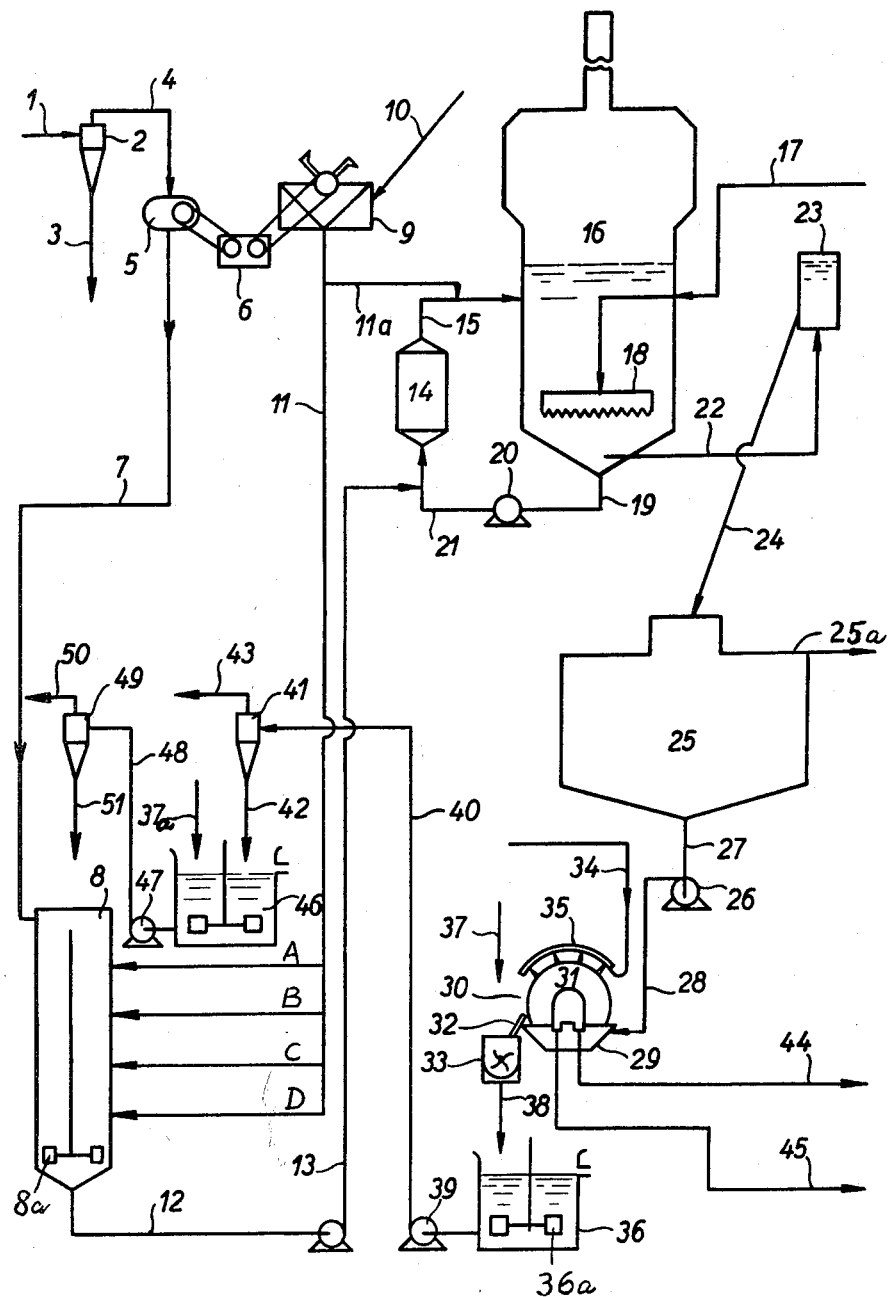

This invention relates to the purification of solutions and more particularly to the purification of sugar juices utilizing liming and carbonation.

While the process of this invention is applicable to the purification of various solutions, for the purpose of illustration and example it will hereinafter be described in connecton with the purification of sugar juices.

Heretofore it has been the customary practice to introduce milk of lime into the raw juice coming from diffusion in order to precipitate impurities. The solution is then carbonated by bubbling carbon dioxide through it to react with the excess lime and precipitate it as calcium carbonate. As the calcium carbonate settles, it takes down with it the insoluble impurities leaving the clarified juice to be carried along the system for further processing. However, in order to take down most of the insoluble impurities it is essential that a concentrated suspension of calcium carbonate be provided. Heretofore this has been accomplished by adding a considerable excess amount of lime to the juice followed by the aforementioned carbonation.

It is therefore the principal object of this invention to provide a process by means of which considerable economy can be achieved in the use of lime. It is another object of this invention to provide a more efficient purification process while at the same time reduce sugar losses. It is a further object of this invention to provide a process wherein the settleability and filterability of the treated juice is improved.

These and other objects which will become more apparent as the description continues can be achieved in a sugar juice purification process by the present invention wherein the calcium carbonate produced by the interaction of the lime and the carbon dioxide is largely removed from the system together with the impurities brought down with it and after treatment to remove the impurities this calcium carbonate is returned to the system. The treatment for removing impurities preferably involves thickening, filtration, and washing to produce a thickened filter cake of the precipitated calcium carbonate and impurities, which filter cake is then repulped with supplementary liquid and conveyed to a calssification device, preferably in the form of a hydrocyclone classification station, from which the clean calcium carbonate is discharged as thickened underflow for return to the system while the supplementary liquor containing the final impurities in the form of slimes is discharged from the classification device as overflow.

In order that this invention may be readily carried into effect this invention will now be described with reference to the accompanying diagrammatic drawings which illustrates a preferred embodiment of a process for the so-called first carbonation of raw sugar juice.

As shown in the drawing, the raw sugar juice from diffusion is introduced into this system through the feed conduit 1 leading into the hydrocyclone classification station 2, which serves to remove the grit and heavier solids which are discharged to waste through the underflow discharge conduit 3. The raw juice is discharged as overflow through the overflow discharge conduit 4 leading to metering pump 5 which is driven from the gear reduction unit 6. The raw juice leaves the metering pump 5 through the conduit 7 leading to the prelimer 8. The prelimer is provided with a tangential feed inlet at the top so that the swirling movement induced by the raw juice is directed in the same direction as the movement induced by the agitator 8a iu prelimer 8, thus resulting in a strong rotation of the juice.

Also driven from gear reduction unit 6 s a bucket type lime feeder 9 into which milk of lime is introduced through lime feed conduit 10 and from which the milk of lime flows along the conduit 11 for introduction into the liquor in the prelimer 8. The conduit 11 is preferably provided with a plurality of branches A, B, C, and D to provide introduction of the lime into a number of spaced regions in the prelimer so that the juice is gradually prelimed. Another branch conduit 11a serves to conduct some of the lime to a point in the system just ahead of the carbonator later to be described.

As a result of the introduction of the milk of lime, impurities are precipitated out of the liquor in the prelimer 8 from which the thus produced suspension is pumped through the conduits 12 and 13 to a mixing tank 14 from the top of which the conduit 15 discharges the pre-limed juice into the carbonator 16. The milk of lime introduced through the conduit 11a serves for a second liming (commonly designated main liming). Carbon dioxide gas for carbonation is introduced into carbonator 16 through the $CO_2$ feed conduit 17 and, by means of the diffuser 18, is bubbled up through the suspension in the carbonator 16, as a result of which the excess lime is precipitated as calcium carbonate. Some proportion of this carbonate suspension is taken along the conduit 19 to the pump 20 from which it is pumped along the conduit 21 to the bottom of the mixing tank 14 for recycling to the carbonator 16. The carbonated juice leaves the carbonator along the conduit 22 which preferably leads to an adjustable overflow box 23 which controls the feed rate of carbonated juice passing along the conduit 24 to the thickener 25. The thickener 25 operates to effect a separation by means of which the precipitated calcium carbonate is settled, also carrying down impurities with it and this mud is then pumped by the pump 26 through the conduits 27 and 28 to the trough 29 of the drum filter 30.

Clarified sugar juice leaves the thickener 25 as clarified overflow 25a and usually proceeds to the 2nd carbonation.

The filter drum 31 is intended, in the arrangement shown, to rotate counter-clockwise and to pick up on its surface a cake of the calcium carbonate and entrained impurities. The cake is finally scraped off the drum by the doctor blade 32 and discharges into the cake collection hopper 33.

As is customary, provision is made for washing the cake collected on the filter drum to remove a large part of the entrapped sugar solution. As shown hot water or other wash liquor passes along the conduit 34 to the spray manifold 35.

The process so far described is a fairly typical example of commercial sugar-juice first carbonation purification process as hitherto practiced.

The present invention differs from the prior art in regard to what happens beyond the filter. In that regard, the cake having been discharged into the hopper 33 is conveyed to the repulper 36 by means of supplementary liquor, such as cold water, flowing through the conduits 37 and 38. The repulper 36 is provided with driven agitator paddles 36a and the repulped filter cake is withdrawn from the repulper 36 by the pump 39 for delivery along the conduit 40 to the hydrocyclone station 41. In the hydrocyclone station 41 a classification is effected as a result of which the now clean calcium carbonate discharges through the underflow discharge conduit 42 into the mixing tank 46 while the bulk of the wash liquid containing the impurities as slimes discharges to waste through the overflow discharge conduit 43.

After addition of further diluting and washing liquid through a conduit 37a, the mud is delivered from the tank 46 by the pump 47 to a second hydrocyclone 49 through the conduit 48. The overflow comprising a further fraction of the removed impurities is discharged to waste through the conduit 50. The classified and cleaned calcium carbonate particles discharge through the underflow discharge conduit 51 into the prelimer 8.

This return of clean calcium carbonate has been found to provide for considerable economy in regard to the amount of lime which has to be introduced into the system. In normal operation as hitherto practiced it was usual to add considerable excess of lime in order to produce a fairly concentrated suspension of calcium carbonate. A high percentage of calcium carbonate is considered essential, first as a settling aid and next as a filter aid. In settling in the thickener the $CaCO_3$ renders the whole suspension much more readily settleable because the fine impurities, which are themselves less readily settleable and are by their natural stickiness somewhat adhesive in character, tend to adhere to the $CaCO_3$ particles and are thus carried down with them. Once these impurities have adhered themselves to the carbonate particles, they are not easily disengaged; indeed, tests show that even with washing of the cake on a drum filter, the filtrate is usefully pure sugar juice, diluted to some extent by the wash water but containing insignificant amounts of the precipitated impurities.

This seems to provide a clear indication that the impurities remain adhered to the $CaCO_3$ even after washing and filtration, and it would be useless to return that unclean carbonate to the system. To remove the adhered impurities it seems that a rather special classification operation is necessary. In that respect it is believed that the hydrocyclone is the ideal apparatus because it seems to perform a "scrubbing" action as a result of which the fine sticky impurities are washed or wiped off the surface of the carbonate particles leaving the carbonate clean for return to the system. In essence, the present invention therefore provides for the desired high concentration of carbonate particles in the system without the use of excess lime which was previously thought necessary.

The wash liquor sprayed on to the cake by means of the manifold 35 passes through the cake on the filter drum into the interior of the drum 31, carrying with it the entrapped sugar juice. It is preferred that the filter drum shall be of the valved type providing for the discharge from the interior of the drum of different concentrations of filtrate. Thus, as shown in the drawing the discharge from one valve compartment can comprise a relatively pure filtrate which is relatively concentrated sugar juice which can be discharged along the conduit 44 to the second carbonation. The other discharge along the conduit 45 can be more dilute and in the form of sweet water which is wash water still containing a small proportion of sugar juice. In order that this sugar content of the sweet water should not be lost from the system it is convenient to use it for slaking of the lime which is introduced into the system through the lime-feed conduit 10. Thus, according to the invention, there is provided a first carbonation system for sugar juice purification in which nothing is wasted from the system and all that is discharged from the system is, on the one hand, the pure juice and, on the other hand, the precipitated impurities.

It will be appreciated that the invention can be practiced with a number of variations. For example, one could use certain types of filter in place of the thickener. Thus a belt filter might serve to combine the functions of the thickener 25 and the drum filter 30. Furthermore, there are many types of filters which could be used in place of the drum filter. It is also conceivable that classification for final separation of the calcium carbonate from the impurity slimes could be achieved by means of a centrifuge. In that respect, however, it is believed that this final separation is best achieved by centrifugal means and that, furthermore, the hydrocyclone is the ideal apparatus for effecting the sort of classification required.

Although the process according to the invention is primarily of interest in connection with the improvement which it achieves in the so-called first carbonation step in sugar juice purification, particularly in regard to lime economy, it may in some cases be worthwhile to use it for $CaCO_3$ recovery from the second or any subsequent step of the purification process. For example, it is quite feasible to merge the mud from the second carbonation with the cake or slurry entering the agitator tank 36.

It is to be understood that although, in the process illustrated, lime is introduced before carbonation, the entire liming operation can be done by introduction of the lime into the carbonator 16 and/or at any one or more points ahead of the carbonator. Likewise, the clean calcium carbonate, instead of or in addition to being reintroduced into the prelimer 8 can be reintroduced into the process at any point or series of points of the process where it may be considered desirable to achieve an increase in solids concentration.

While this invention has been described and illustrated in certain embodiments, it is readily apparent that obvious equivalents exist for specific details contained in the illustrative embodiments. It is, therefore, intended that all such equivalents as may be embraced within the scope of the subjoined claims are to be considered as part of this invention.

I claim:

1. Continuous process for purifying sugar juice comprising the steps of subjecting the raw juice to a liming operation, subjecting the limed juice to treatment with carbon dioxide so as to precipitate calcium carbonate together with impurities, separating the calcium carbonate and impurities from the sugar juice, mixing the separated calcium carbonate and impurities with wash liquor to form a suspension, subjecting the thus formed suspension to centrifugal classification whereby the suspension is classified into a fine fraction containing fine calcium carbonate particles and impurities and a coarse fraction containing clean relatively coarse calcium carbonate particles, and recycling at least a portion of said clean relatively coarse calcium carbonate particles back into the process so that said recycled carbonate is present during the precipitation of calcium carbonate in the juice.

2. The process according to claim 1 wherein said centrifugal classification comprises the employment of hydrocyclone effects.

3. A treatment system for the purification of sugar juice which comprises, a liming station receiving raw juice and having means for treating the juice with lime, a carbonation treatment station receiving the limed juice from said liming station for reacting carbon dioxide with lime to effect precipitation in the juice of calcium carbonate along with juice impurities, a separating station for effecting the separation of calcium carbonate along with impurities from the juice, a classification treatment station for classifying the separated calcium carbonate and impurities into a fine fraction containing fine calcium carbonate particles and impurities and a coarse fraction containing clean relatively coarse calcium carbonate particles, and means for introducing at least a portion of said clean relatively coarse calcium carbonate into said liming station so as to be present during the precipitation of calcium carbonate in said carbonation station.

4. Continuous process for purifying sugar juice comprising steps of, introducing lime into the raw juice, carbonating the limed juice to precipitate the lime as calcium carbonate to which impurities will adhere, subjecting the carbonate laden juice to sedimentation to produce a settled mud fraction containing calcium carbonate particles and impurities and a purified juice fraction, washing and filtering the mud fraction to produce a filter cake of calcium carbonate and impurities containing substantially no sugar values, repulping the thus produced filter cake with wash liquor to form a suspension, subjecting said suspension to centrifugal classification whereby said suspension is classified into a fine fraction containing fine calcium carbonate particles and impurities and a coarse fraction containing clean relatively coarse carbonate particles and recycling at least a portion of said coarse fraction back into the process so that said recycled carbonate is present during precipitation of calcium carbonate in the juice.

5. Process according to claim 4 wherein said recycled carbonate acts as a settling aid during sedimentation and a filter aid during filtration.

6. Process according to claim 4 wherein a portion of said clean relatively coarse calcium carbonate particles is recycled back into the process ahead of the sedimenation step.

References Cited in the file of this patent
UNITED STATES PATENTS

| | | |
|---|---|---|
| 2,557,800 | Seailles | June 19, 1951 |
| 2,697,049 | Brieghel-Muller | Dec. 14, 1954 |
| 3,089,789 | Van Note | May 14, 1963 |

OTHER REFERENCES

Chem. Abstracts; vol. 53, p. 13630g, July-August 1959.
Chem. Abstracts; vol. 53, p. 4783f, July-August 1959.
Adamov: The International Sugar Journal, August 1959, page 244, column 1, 127–56.